May 29, 1934.  E. SCHWEIZER  1,960,281
MEANS FOR TESTING
Filed April 28, 1930   2 Sheets-Sheet 1
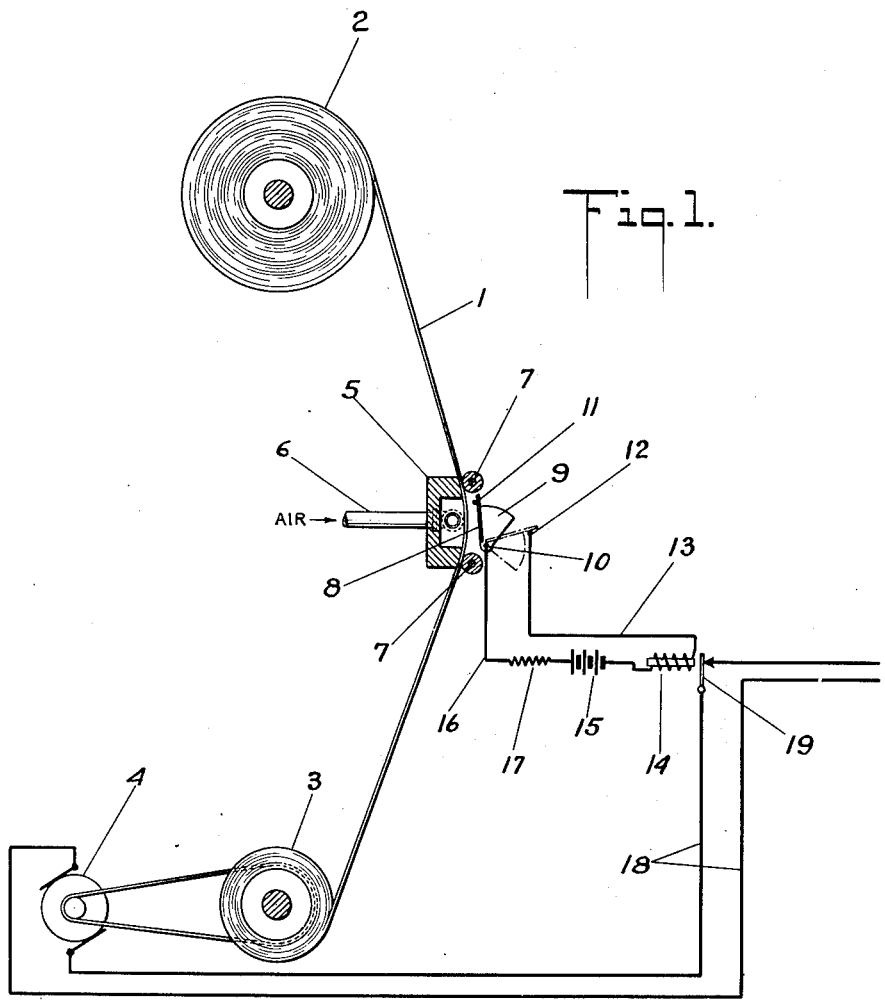
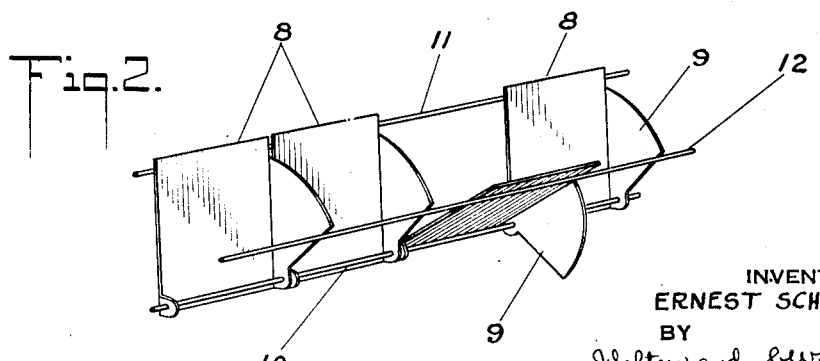
INVENTOR
ERNEST SCHWEIZER
BY
ATTORNEYS May 29, 1934.　　　　　E. SCHWEIZER　　　　　1,960,281
MEANS FOR TESTING
Filed April 28, 1930　　　2 Sheets-Sheet 2
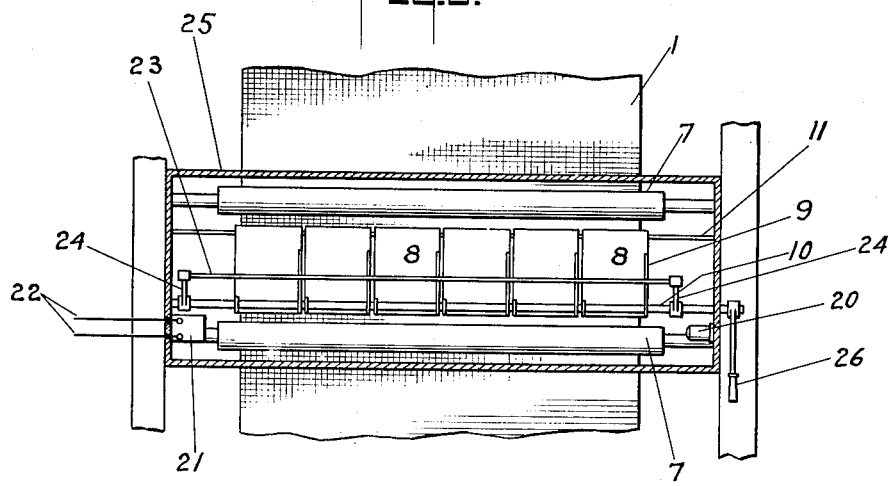
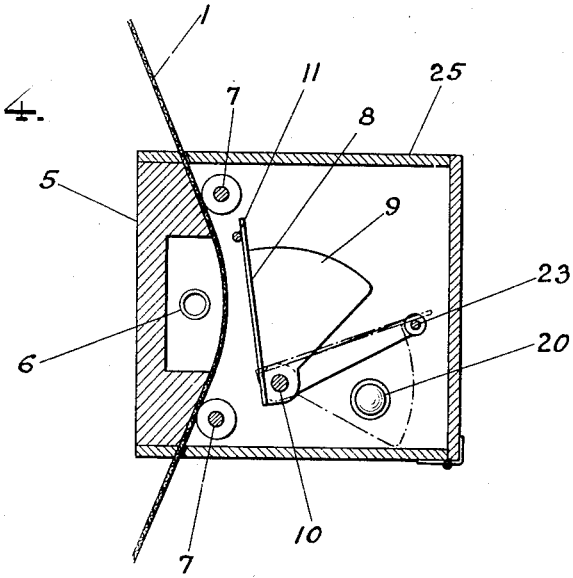
INVENTOR
ERNEST SCHWEIZER
BY
ATTORNEYS Patented May 29, 1934

1,960,281

UNITED STATES PATENT OFFICE 1,960,281

MEANS FOR TESTING

Ernest Schweizer, East Orange, N. J., assignor to Celluloid Corporation, a corporation of New Jersey Application April 28, 1930, Serial No. 447,946

4 Claims. (Cl. 177—311)

This invention relates to method of and apparatus for testing materials whereby any holes or apertures therein may be readily detected.

An object of my invention is to provide method of and means for testing materials for the detection of holes therein.

A further object of my invention is to provide pneumatic means for testing holes in materials. Other objects of my invention will appear from the following detailed description.

The detection of holes or orifices in sheets often offer serious difficulty. Usually this is done by visual inspection. However, in the case of more or less transparent material, inspection by the naked eye is tedious and frequently ineffective. In certain instances particularly in the case of reticulated fabrics or cloths made of wire strands or yarns of natural fibres that have been coated with a transparent material such as a plastic composition containing cellulose acetate, it is important to detect meshes that have not been closed by the plastic composition, since the presence of these unclosed meshes prevents the resulting product from being water-proof or wind-proof.

In accordance with my invention I provide means for testing a moving sheet of material intended to be impervious to the passage of a gas, whereby the presence of holes or orifices in the material to be tested permits the passage of a stream of gas that actuates a signal to inform the operator of the same.

Whilst this invention is of particular importance in connection with the testing of wire cloth that has been coated with a plastic composition containing cellulose acetate, it may be employed for testing sheets of films or foils containing derivatives of cellulose or metals, paper or in general any material which should be free from holes.

Referring to the drawings, Figure 1 is a diagrammatic view partly in section of one means for carrying out my invention.

Figure 2 is an enlarged perspective view showing a detail of the form shown in Figure 1, Figure 3 is a side view partly in section of a modification of my invention, and Figure 4 is an enlarged cross section showing a detail of the form shown in Figure 3.

Referring to all the figures, the sheet material 1 to be tested is caused to pass from the roller 2 to the roller 3, which is caused to rotate through a pulley and belt by means of the motor 4. In its passage the sheet material is caused to pass across the chamber 5 which is supplied with air or other gas under pressure by means of the pipe 6. The sheet 1 is caused to press against the walls of the chamber 5 by means of the rubber rolls 7 in order to obtain better sealing of the chamber 5 by the sheet 1.

On the side of the sheet 1 opposite the chamber 5 there is mounted a series of flaps 8 in close juxtaposition, and which may be provided with fins or arms 9, although such fins or arms may be eliminated in the form shown in Figures 1 and 2. The flaps 8 are preferably made of thin aluminum sheets or any other light electric conducting material. The flaps 8 are pivotally mounted on a wire or rod 10 which passes through eyes in the lower part of the fins 9. In the upright position the tops of the flaps 8 rest on the wire or bar 11.

Referring to Figures 1 and 2, a wire or other electric conductor 12 is stretched across the width of the device and this conductor 12 is connected by the wire 13 to the relay 14 which in turn is connected to the battery 15. The wire or rod 10 is connected through the connection 16 and rheostat 17 to the battery. The electric current for operating the motor 4 is supplied by the conductors 18 and a switch 19 that is actuated by the relay 14 is placed in the circuit of these conductors.

Referring to Figures 3 and 4 wherein a modification of this invention is shown, a source of light 20 is provided at one end of the device and a selenium or other photoelectric cell 21 is provided in the other. This photoelectric cell 21 is connected by means of the conductors 22 to a relay operation mechanism which controls the supply of electric current to the motor 4 in a manner similar to that shown in Figure 1. A wire or rod 23 is provided in front of the flaps 8 and this is attached to arms 24 on the rod 10 which is provided with the operating handle 26. To prevent access of extraneous light the mechanism is enclosed in a chamber provided with opaque walls 25.

The operation is as follows:

Referring to Figures 1 and 2, assume that a sheet of wire cloth coated with transparent cellulose acetate material is to be tested. The flaps 8 are all set in an upright position and the sheet 1 is caused to pass from the roller 2 across the face of the chamber 5 to the roller 3 which is driven by the motor 4. Air or gas at a suitable pressure, say less than 1 lb. per square inch is supplied to the chamber 5. As long as there is no opening or hole in the sheet 1 being tested, the winding of the sheet on the roller 3 continues. However, if the sheet contains such hole or opening when the part containing it passes over the mouth of the chamber 5, the air passes through such hole and blows the flaps 8 down as shown in dotted lines in Figure 1 and also shown in Figure 2, the flaps thereby resting on the conductor 12 and closing the circuit that operates the relay 14. The relay 14 thereupon opens the switch 19 of the circuit supplying current to the driving motor 4 and the machine stops. The momentum of the machine carries the sheet a short distance after the shutting off of the power but this distance will be predetermined for a given machine. The operator observes which flap 8 has dropped and seeks the hole that causes the defect at such predetermined distance immediately below the fallen flap. After having made the required notation or correction on the sheet, the operator starts operation of the machine by raising the fallen flap.

The operation of the modification shown in Figures 3 and 4 is in all respects similar to that of the form shown in Figures 1 and 2 except that a photoelectric cell controls the operation of the relay 14. When all the flaps 8 are in the upright position, the ray of light from the source 20 impinges on the photoelectric cell 21 and the motor 4 causes the winding of the sheet 1. However, if a defect in the sheet permits air from the chamber 5 to pass through the same, a flap 8 is blown down as is shown in dotted lines in Figure 4, and the fin 9 thereof cuts off the light from the source 20 so that it does not impinge on the photoelectric cell 21 and this causes a relay to open a switch in the circuit supplying the current to the motor. To start the operation of the motor again, the fallen flap 8 is raised by raising the handle 26 which raises the rod 23 upon which it is resting.

It is to be understood that the foregoing detailed description is given by way of illustration and that many variations may be made therein without departing from the spirit of this invention.

Having described my invention what I claim and desire to secure by Letters Patent is:

1. In apparatus for detecting holes in a sheet, the combination with a chamber having an opening, means for supplying gas under pressure to said chamber, means for passing the sheet over the opening in the chamber to close the same, an electric control circuit for said last named means, of a series of flaps pivotally mounted on the opposite side of the sheet in such a manner that they are moved by passage of the gas through a hole in the sheet, and means operated by the movement of the flaps to close said control circuit.

2. In apparatus for detecting holes in a sheet, the combination with a chamber having an opening, means for supplying gas under pressure to said chamber and means including an electric motor for passing the sheet over the opening in the chamber to close the same, of a series of flaps pivotally mounted on the opposite side of the sheet in such a manner that they are moved by passage of the gas through a hole in the sheet, and means operated by the movement of the flaps to interrupt the supply of current to the electric motor.

3. In apparatus for detecting holes in a sheet, the combination with a chamber having an opening, means for supplying gas under pressure to said chamber and means including an electric motor for passing the sheet over the opening in the chamber to close the same, of a series of flaps pivotally mounted on the opposite side of the sheet in such a manner that they are moved by passage of the gas through a hole in the sheet, a switch in the circuit sppplying the current to the electric motor, a relay operating said switch, and a circuit for the relay adapted to be closed by the movement of the flaps.

4. In apparatus for detecting holes in a sheet, the combination with a chamber having an opening, means for supplying gas under pressure to said chamber and means including an electric motor for passing the sheet over the opening of the chamber to close the same, of a series of flaps having projecting fins pivotally mounted on the opposite side of the sheet in such a manner that they are moved by passage of the gas through a hole in the sheet, a source of light at one end of the series of flaps, a photo-electric cell at the other end of the flaps and controlling the current of the motor, said source of light and photoelectric cell being arranged so that normally the light impinges upon the cell, but upon movement of a flap its fin cuts off the light from the cell.

ERNEST SCHWEIZER.